(12) United States Patent
Fridman et al.

(10) Patent No.: US 7,492,513 B2
(45) Date of Patent: Feb. 17, 2009

(54) AUTOSTEREOSCOPIC DISPLAY AND METHOD

(76) Inventors: Sergey Fridman, 905 Filmore St., Monterey, CA (US) 93940; Vladimir Fridman, 2451 Greenwich St., #304, San Francisco, CA (US) 94123-3354

( * ) Notice: Subject to any disclaimer, the term of this patent is extended or adjusted under 35 U.S.C. 154(b) by 0 days.

(21) Appl. No.: 10/742,586

(22) Filed: Dec. 19, 2003

(65) Prior Publication Data

US 2004/0184145 A1 Sep. 23, 2004

Related U.S. Application Data

(63) Continuation-in-part of application No. 09/683,587, filed on Jan. 23, 2002, now abandoned.

(51) Int. Cl.
*G02B 27/22* (2006.01)
(52) U.S. Cl. .............. 359/462; 348/59; 353/7
(58) Field of Classification Search ......... 359/462–464, 359/486; 353/7; 348/59; 349/15
See application file for complete search history.

(56) References Cited

U.S. PATENT DOCUMENTS

| | | | | |
|---|---|---|---|---|
| 3,503,315 | A | 3/1970 | de Montebello | 396/330 |
| 3,535,993 | A | 10/1970 | Jones | 396/330 |
| 4,621,897 | A | 11/1986 | Bonnet | 359/462 |
| 4,649,425 | A | 3/1987 | Pund | 348/52 |
| 5,083,199 | A | 1/1992 | Borner | 348/59 |
| 5,099,320 | A | 3/1992 | Allio | 348/59 |
| 5,132,839 | A | 7/1992 | Travis | 359/462 |
| 5,349,379 | A | 9/1994 | Eichenlaub | 348/59 |
| 5,392,140 | A * | 2/1995 | Ezra et al. | 349/15 |
| 6,055,013 | A * | 4/2000 | Woodgate et al. | 348/59 |
| 6,157,402 | A * | 12/2000 | Torgeson | 348/59 |
| 6,233,035 | B1 | 5/2001 | Toshiyuki | 355/22 |
| 6,795,241 | B1 * | 9/2004 | Holzbach | 359/463 |
| 6,813,083 | B2 * | 11/2004 | Kobayashi | 359/619 |
| 2002/0114077 | A1 * | 8/2002 | Javidi | 359/618 |
| 2002/0180660 | A1 * | 12/2002 | Wang et al. | 345/4 |

FOREIGN PATENT DOCUMENTS

JP 11271749 A * 10/1999

OTHER PUBLICATIONS

U.S. Appl. No. 60/263,444.*
Three-dimensional display system for medical imaging with computer-generated integral photography, Nakjima, S. et al., in Stereoscopic Displays and Virtual Reality Systems VII, John 0. Merritt, Stephen A. Benton, Andrew J. Woods, Mark T. Bolas, Editors, Proceedings of SPIE vol. 3957 (2000).*
Takanori Okoshi, "Three-Dimensional Imaging Techniques", pp. 42-59, Academic Press, New York, USA.
Ken Perlin et al., "An Autostereoscopic Display", Proceedings of Siggraph 2000, pp. 319-326.
Fresnel Technologies, Inc., Fresnel Lenses 2003.

* cited by examiner

*Primary Examiner*—Lee Fineman
(74) *Attorney, Agent, or Firm*—John McCormick; Elisabeth S. Sussex

(57) ABSTRACT

An apparatus and method are provided for generating a three-dimensional image having all four physiological depth perception cues. One embodiment includes backlighting device for projecting light; a spatial light modulator for modulating light emanated by the backlighting device; a lens array having a plurality of lenses for receiving and redirecting the light; and an optional aperture screen for inhibiting unwanted light and for minimizing reflections from external lighting. Embodiments of the invention may be used to reproduce directional distribution of light from a computer-generated image, a photographically captured three-dimensional scene, or other from other sources.

18 Claims, 20 Drawing Sheets

AUTOSTEREOSCOPIC DISPLAY AND METHOD

CROSS-REFERENCE TO RELATED APPLICATIONS

This application is a continuation-in-part of U.S. patent application Ser. No. 09/683,587 filed Jan. 23, 2002, now abandoned which disclosure is hereby incorporated by reference.

INTRODUCTION

1. Field of the Invention

The present invention relates to stereoscopic devices and methods. More particularly, the present invention relates to autostereoscopic devices for producing images having all four physiological depth perception cues.

2. Background

The invention described herein originates from the autostereoscopic image capture and reproduction method called Integral Photography. The term "autostereoscopic" refers to stereoscopic images that can be viewed without use of any additional equipment by the observer, such as special glasses. In a conventional two-dimensional image there are usually several psychological cues presented to the observer that provide the perception of depth. These cues include object size, shadow, linear perspective, and object overlapping. However, a two-dimensional image is unable to provide any physiological cues and thus cannot provide a true perception of depth.

The physiological cues are summarized in Okoshi's book (Okoshi, 1976) and they are: accommodation, convergence, binocular parallax, and monocular movement parallax. Accommodation is a cue given by the adjustment of the focal length of the eye's crystalline lens when an eye focuses on a particular object. Convergence is a cue given by the angle made by the two viewing axes of observer's eyes. Binocular parallax is a cue caused by the difference between the views seen by the two eyes of an observer. Monocular movement parallax is a cue observed when a person is moving and is caused by the changing view in each of the person's eyes. Accommodation and monocular parallax are available even when we see an object with a single eye.

There are several stereoscopic techniques that provide at least one of the physiological depth cues. Binocular stereoscopic technique is based on the idea that when two slightly different images are provided to two eyes of an observer then the binocular parallax will be observed. However, this technique does not provide any of the other three physiological cues.

Holography is a technique that reproduces all four physiological cues. Unfortunately, it is very difficult to generate and produce a synthetic hologram because a very fine interference pattern needs to be computed and reproduced. This makes it difficult to implement an autostereoscopic display based on the holography principle. Another disadvantage of the holography approach is that it records and reproduces a monochromatic light, thus the reproduced image has one dominant color.

Another stereoscopic image reproduction method is called parallax barrier technique. This method is based on the idea of showing different images on a display through a blocking barrier that has only one vertical slit open at a time. Each open slit has certain image shown through it. This technique, however, reduces display resolution and results in a low light display since the parallax barrier blocks most of the light.

Numerous efforts were made trying to create a stereoscopic display based on above techniques in combination with head tracking methods. Eye tracking was part of the invention of a binocular screen that does not require any special glasses in the U.S. Pat. No. 5,349,379. Eye tracking also allowed other researchers to optimize parallax barrier display. However, the disadvantages shown above still remain for every aforementioned type of the stereoscopic display.

Integral Photography is a method that like holography provides all four physiological depth cues. However, images displayed using Integral Photography method are much easier to generate and to reproduce than hologram interference patterns. Lippmann originally envisioned the concept of Integral Photography. Lippman's research is described in detail in Academe des Sciences, Comptes Rendus, 146, 1908, pp 446-451, and in the March 1932 Journal of the Optical Society of America, vol. 21, pp. 171-176. The autostereoscopic display employing cellular elements was envisioned as a device for presentation of integral photographs, which were supposed to exhibit full stereoscopic effect. Lippmann's theoretical suggestions, however, turned out to exhibit some fundamental problems when efforts were made to implement the concept by other researchers. Most importantly, the image as seen by the observer appeared pseudoscopic, having a reversed depth.

In 1950's, research on Integral Photography by Roger de Montebello led to new inventions that helped eliminate the pseudoscopic effect by geometrically reorienting elemental images. However, some problems still remained. Among these problems are the limit of the image depth that could be provided without blurring, the relatively expensive process of making lens arrays, the problem of lens aberrations, the reflection of light from the lens array that causes the observer to focus his or her eyes on the plane of the display instead of the virtual image behind the screen and thus making it difficult to observe the stereoscopic effect.

Research in this field later led to inventions of various displays based on the same principle of Integral Photography such as CRT and LCD autostereoscopic displays. All of these inventions, however, either exhibited same problems as de Montebello's device or proposed means to correct these problems, which were not technically possible or were not commercially feasible.

Yet other devices of the prior art function using time multiplexing, requiring complex timing operations in the display system. Further, such display systems of the prior art often cost-prohibitive.

As can be seen, there is a need for a device and method that produces an autostereoscopic, polychromatic, three-dimensional image of superior quality, the image having all four physiological depth perception cues, as previously described. It is desirable to produce such an image without excessively limiting one's field of view of such an image. It is further desirable to readily and economically produce and generate such an image.

SUMMARY OF THE INVENTION

One aspect of the present invention includes an image projector which generates a non-diffuse light source of light rays of predetermined directions, intensities, and colors; and a lens array with a plurality of lenses, such that each lens in the plurality of lenses may receive the light rays, each light ray of the light rays having a predetermined direction, intensity and color at a point of receipt on each lens in the plurality of lenses and may redirect the light rays to form a three-dimensional image including the four physiological depth perception cues of accommodation, convergence, binocular parallax, and monocular movement parallax.

Another aspect of the present invention a backlighting means with a non-diffuse light source of light rays having predetermined directions; a lens array with a plurality of lenses, where each lens may receive the light rays, each light ray of the light rays having a predetermined direction at a point of receipt on each lens in the plurality of lenses and each lens may redirect the light rays; and a spatial light modulator which may receive the light rays array and may change the colors and intensities of each of the light rays to predetermined values to form a three-dimensional image having the four physiological depth perception cues. The spatial light modulator can be disposed between the lens array and the backlighting means.

Yet another aspect of the present invention includes a backlighting means with a non-diffuse light source of light rays of predetermined directions; a lens array with a plurality of lenses, where each lens may receive the light rays, each light ray having a predetermined direction at a point of receipt on each lens, and where each lens may redirect the light rays; an opaque aperture screen with a plurality of transparent apertures therein, where each aperture may permit passage of the redirected, non-diffuse light rays from the lens array therethrough, the aperture screen having a first surface which may inhibit unwanted light from any source; and a second surface which may absorb unwanted light from any source; and a spatial light modulator which may receive the light rays from the non-diffuse back lightning means and may change colors and intensities of each of the light rays to predetermined values to form a three-dimensional image having the four physiological depth perception cues.

Still another aspect of the present invention includes steps of providing a non-diffuse light source having light rays; and receiving, with a lens array having a plurality of lenses, the generated light rays, each light ray of the generated light rays having a predetermined direction, intensity and color at a point of receipt on each lens in the plurality of lenses; and redirecting the received light rays to form a three-dimensional image having the four physiological depth perception cues.

These and other features, aspects and advantages of the present invention will become better understood with reference to the following drawings, description, and claims.

DETAILED DESCRIPTION OF THE INVENTION

Figure 1:
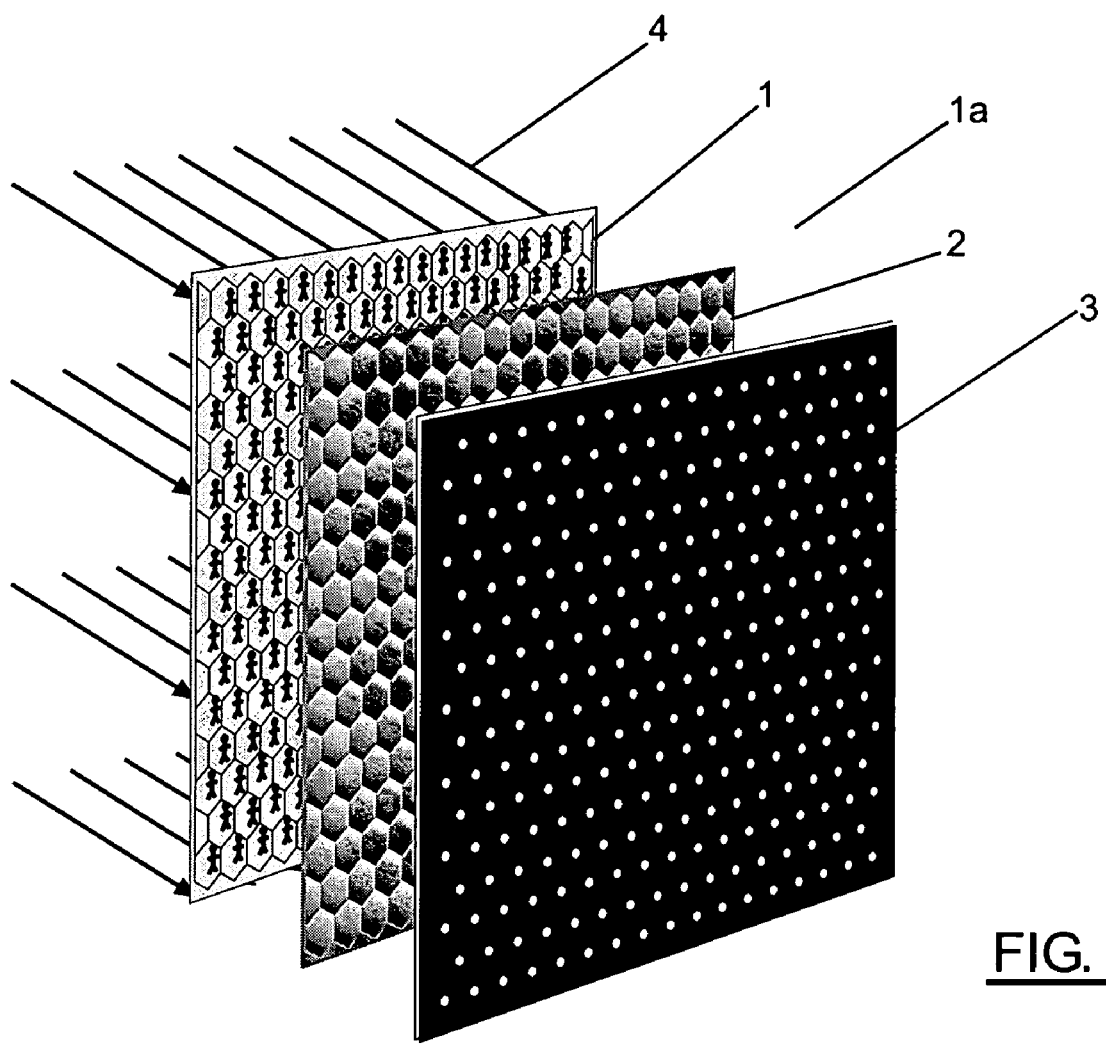
FIG. 1 is a perspective view of an embodiment according to the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention comprises an apparatus and method for generating a polychromatic, three-dimensional still or moving image display having the four physiological depth perception cues of accommodation, convergence, binocular parallax, and monocular movement parallax. It is contemplated that the present invention has broad applicability in various venues, including large-audience entertainment or informational arenas, such as auditoriums, as well as homes and offices. For example, the contemplated uses include an apparatus for panoramic and cinematic image production as well as a display device for televisions and monitors.

More specifically, the present invention provides an apparatus of compact design and a method for producing a three-dimensional still or motion, full-color image of superior quality, the image having all four physiological cues of accommodation, convergence, binocular parallax, and monocular movement parallax (hereafter, the autostereoscopic display). The present invention utilizes an economical component scheme of non-moving parts with no requirement for complex, formulaic functions or equipment, such as those required in time multiplexing systems of the prior art. The present invention generates true, three-dimensional images having vibrant color and distinct quality. The apparatus and method of the present invention produces the autostereoscopic displays viewable without the use of visual aids such as "3D" spectacles or other devices used or worn by the viewer. In contrast, systems of the prior art failed to produce images having all four physiological cues and, therefore, could only provide inchoate or blurred images lacking true three-dimensional quality. Alternatively, the prior art required personal viewing devices or complex, expensive configurations and functionality to produce viewable three-dimensional images. Such systems were unable to produce the polychromatic aspects of a real image. The present invention further provides viewing capabilities for an unlimited number of viewers concurrently and provides freedom of movement for each individual viewer. In contrast, the prior art significantly restricted the number of viewers able to concurrently view the display. The prior art further imposed unduly restrictive viewing requirements such that an image was viewable from a precise location such as within a fixed space of one to two inches. Movement of the viewer's head beyond this range distorts or degrades the quality of the image, thus inhibiting viability of the entire scheme.

Various embodiments of the present invention may include, but are not limited to, one or more of the following components in various combinations: an image projector or source of light which may include a backlighting means, a spatial light modulator, or both; a lens array; and an aperture screen. The aperture screen is used with arrays of converging lenses as a device for selecting only those rays from the backlighting means that have a predetermined direction before entering the spatial light modulator. Rays having the predetermined direction are modulated by the spatial light modulator and then refracted by lenses of the lens array. Individual lenses translate spatial modulation of the spatial light modulator into directional modulation by refracting the incoming rays. Also each lens collects all rays with the predetermined direction at focal point. Individual apertures are placed at the focal points of lenses and block any unwanted light.

To maximize effectiveness of the backlighting means, all rays emitted by the backlighting means may have a predetermined direction. For instance, the backlighting means can be a collimated light source with all rays orthogonal to the surface of the spatial light modulator and the lens array.

The invention may be particularly applicable as a new method set out above for displaying modulating photograms. The term "modulating photogram" as used herein means a photographic or artificially generated record of an optical field in which the record consists of a multiplicity of independent and non-overlapping minute, elemental images displayed on a transparent medium each of which is a projection of a large portion of the field. The main purpose of the modulating photogram is to capture a light field that exists in a certain bounded window in space. This involves light wavelength and irradiance or intensity at all points and in all directions in that window as long as light direction is within modulating photogram's field of view. The display of the modulating photogram should approximate the light field captured on it and hence the observer should see the captured scene in three-dimensions.

The meaning of the term "modulating photogram" differs from the term "photogram" that is used in relation to integral photography and as defined in the U.S. Pat. No. 3,503,315. While traditional photogram usually consists of elemental images each of which is a perspective projection of some three dimensional scene, the modulating photogram may consist of images that are not necessarily a perspective projection of the scene. Projection may be different and not necessarily linear for backlighting means other than collimated light and for lens arrays that are characterized by substantial aberrations. Some methods of taking modulating photograms using special photographic equipment were described in the prior art and are not objects of this invention. A method of artificially generating a modulating photogram, for example using computers in modeling and displaying of virtual objects will be described in the details of the invention. A controlled spatial light modulator such as a liquid crystal display can be used to realize the modulating photograms.

The first category introduces a new way of illuminating the spatial light modulator. Specifically, the spatial light modulator is illuminated by light that is not diffuse as in the prior art. Instead, the light should have a predetermined direction of rays that comprise it such as collimated light or light from a point source. In various embodiments, the lens array may be made to work with a specific light type and may focus it at a predetermined surface where the aperture screen will be placed. The most intuitive embodiment of this invention would consist of a parallel light source that emanates light in a direction orthogonal to the plane of the modulating photogram as well as to the plane of the lens array. A modulating photogram does not have to be in the focus of the lens array and in theory could be at any distance from it along the line that is normal to the lens array. This invention, when implemented, may eliminate most of the lens aberration problems characteristic to the traditional integral photography displays of the prior art.

The second part of the invention introduces a new way of eliminating the problem of reflected and scattered light from the front of the lens array. This part also introduces a way of selecting only light that falls on the spatial light modulator with a predetermined direction of rays even if the light from the backlighting means exhibit some diffuse properties. For example, an opaque screen may be placed in front of the array at the distance that is equal to exactly one focal length of the lens array. The screen having apertures that coincide with the focal points of individual lenses passes only light modulated by the spatial light modulator and focused by the lens array and only the light that has a predetermined direction of rays at the spatial light modulator. The aperture screen absorbs most of parasite light.

The third part of this invention deals with the new type of lens array that may be used to produce the autostereoscopic image. Since all that is required of the lens array is to focus the incident light that has predetermined direction of rays, then lens array may be configured in a variety of ways. For example, the lenses of the lens array may be spherical lenses, aspherical lenses, Fresnel lenses, diffraction lenses, or combinations thereof. This relieves many restrictions on the part of the quality of individual lenses in the lens array, thus the process of producing lens arrays is likely to become less expensive. This also allows usage of lenses with very short focal distance, which increases the autostereoscopic display's field of view and adheres to more compact design.

Referring now to the drawings, wherein similar reference characters designate corresponding parts throughout the drawings, there is shown generally in FIG. 1 an embodiment of an autostereoscopic display apparatus 1a comprising a spatial light modulator 1 that may be illuminated with a collimated light source 4, lens array 2, and the aperture screen 3. The aperture screen 3 may be used to recreate a light field that would be a good approximation to the light field from a three-dimensional scene. The modulating photogram may be displayed by means of the spatial light modulator 1. An opaque box (not shown) may be fitted around the rear and the sides of the autostereoscopic display apparatus 1a to exclude extraneous light.

The term "spatial light modulator" as defined herein refers to a device whose optical transparency and color at different points can be controlled. The most primitive example of a spatial light modulator is a slide or a picture printed on a piece of plain transparent material. Another example of a spatial light modulator is a liquid crystal display (LCD).

As shown, there is provided a lens array 2, which may comprise a transparent, uncolored plastic material formed as a closely packed network of small uniform elements (lenses 2a). Each lens 2a may collect the incoming parallel light at a focal point in front of the lens array 2. The lenses 2a may be conventional lenses, however, since the lenses 2a do not have to deal with the light any direction other than orthogonal to the plane of the lens array 2, they could be embodied as Fresnel or diffraction lenses. The packing of lenses 2a may be preferably hexagonal or honeycomb pattern, as shown in FIG. 1, but could be any other arrangement, such as square or triangular. The lens array 2 can also be replaced with a lenticular screen (not shown) comprising a plurality of cylindrical lenses placed next to each other in the horizontal direction.

A modulating photogram as defined above may be realized on the spatial light modulator 1 and consists of a multiplicity of independent and non-overlapping elemental images. In order to maximize the field of view each elemental image, it is desirable but not necessary, to be of the same shape and size as each lens 2a of the lens array 2. In addition, the plane of the modulating photogram may be parallel to the plane of the lens array 2 and each elemental image may coincide with exactly one lens 2a of the lens array 2. This arrangement may ensure that any light ray orthogonal to the plane of the modulating photogram goes through one image element of the modulating photogram and one lens 2a of the lens array 2. In reality, however, the light can deflect from the spatial light modulator 1 due to the diffusing nature of the comprising material or due to a light diffraction effect. To minimize both of these problems, the spatial light modulator 1 may be placed right next to the lens array 2 with a minimum of space between them.

Figure 2:
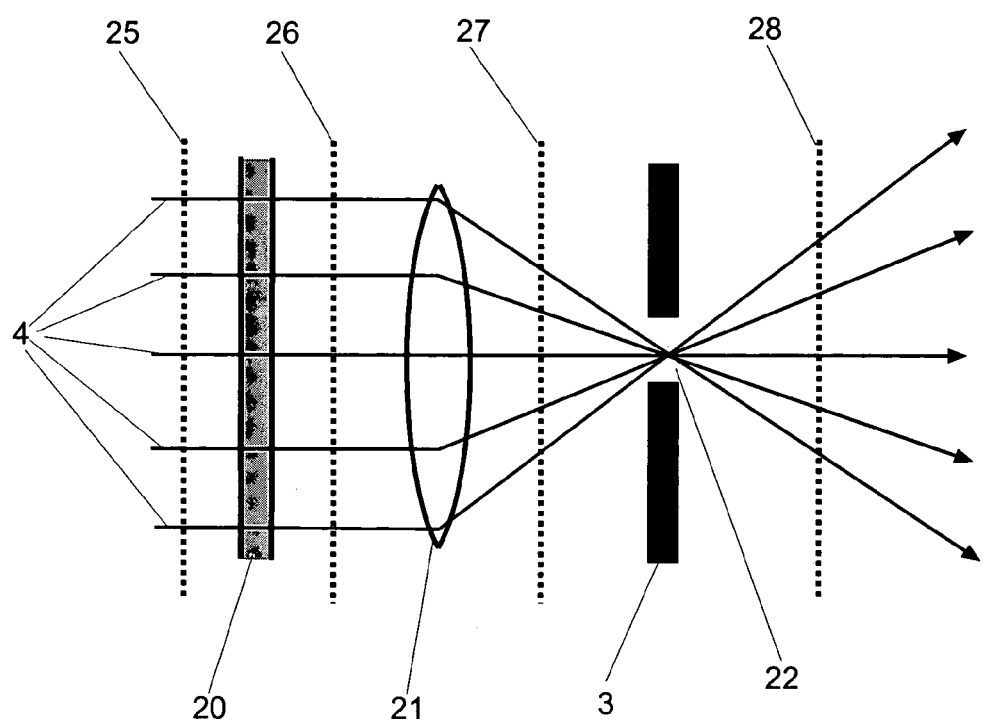
FIG. 2 is a magnified view of a portion of the embodiment of FIG. 1, according to the present invention.

With reference to FIG. 2, there is shown a magnified view of a portion of an embodiment of the present invention having a portion of a spatial light modulator 20, a lens 21, and a portion of an aperture screen 3. A collimated light source 4 provides elemental image at stages 25, 26, 27, and 28 (described below) of the modulating photogram realized on the spatial light modulator 1, depicted as a portion of light field as seen through the window bounded by the elemental image from the point that is situated on the corresponding lens axis one focal distance away from the elemental image. The focal distance is the focal distance of a corresponding lens 21 of a lens array (not shown). The purpose of each elemental image may be to reproduce light irradiance and wavelength for all directions within the display's field of view. However, each elemental image by itself does not reproduce the direction of the light. Lenses 21 of the lens array (not shown) placed next to the spatial light modulator 20 reconstruct the light direction.

In various embodiments, light emitted from the parallel light source may be transmitted through the spatial light modulator, and then collected by each lens of the lens array at the focal point of each lens. The aperture screen may be placed one focal distance from the lens array and aperture centers coincide with lens array's focal points the light coming out of each aperture in the aperture screen will have the same irradiance and colors for all directions within the display's field of view as the light that would have gone through same points had there been a real scene to the left of the aperture screen. The viewer observing the display will thus observe the scene that was used to create the modulating photogram and will be able to view it from any direction provided he or she stays within display's field of view. Therefore, the stereoscopic effect will be observed.

Figure 3:
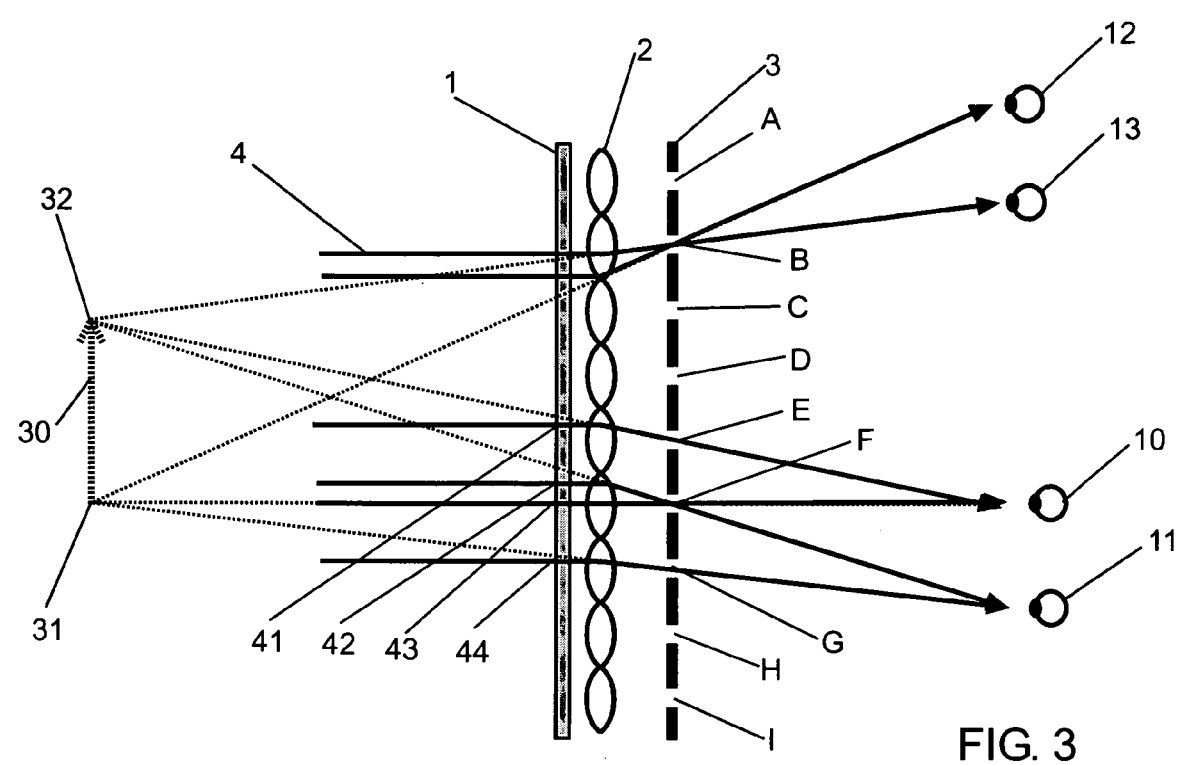
FIG. 3 is a cross-sectional view of a portion of the embodiment of FIG. 1, according to the present invention.

By way of additional explanation, reference is had to FIG. 3, which shows the aforementioned setup used in an embodiment of the invention. FIG. 3 and other figures are not drawn to scale and are provided purely for illustrative purposes for easier description of the invention. It is a principle of optics that the source of any ray can be found by reversing the direction of the ray and tracing it through the optics back to the source. As shown in FIG. 3, two eyes 10, 11 of an observer are observing a static virtual object 30 through the plane of the aperture screen 3. Individual apertures in the aperture screen 3 are lettered A, B, C, . . . I. Each aperture A-I represents a unique point on the screen surface of an autostereoscopic display. Each point or aperture A-I emits light of different irradiance and color content for different directions. The eye 10 looking in the direction of point E sees the top 32 of the virtual image 30. As can be seen from the FIG. 3, the information about this virtual point, consisting of color, irradiance, and direction, may be reproduced from a point 41 on the spatial light modulator 1.

Similarly, the same eye 10 looking in the direction of the aperture F of the autostereoscopic display sees the bottom 31 of the virtual object 30. The information for the given direction about the virtual point 31 may be reproduced from the point 43 on the spatial light modulator 1. Following the same analysis it can be shown that the eye 11 sees the top 32 of the virtual object 30 through aperture F. This information reproduced from a point 42 on the spatial light modulator 1. Also, the same eye 11 sees the bottom 31 of the virtual object 30 through aperture G. This information may be reproduced from a point 44 on the spatial light modulator.

Suppose the observer moves to a different location and looks at the autostereoscopic display with two eyes placed as 12 and 13 on the FIG. 3. The two eyes will observe different points from the aperture B. Specifically the eye 13 will see the top 32 of the virtual object 30, while the eye 12 will observer the bottom 31 of the same virtual object 30.

As can be seen from FIG. 3, the eyes 10 and 11 observe different views. Therefore the binocular parallax depth perception cue may be reproduced by the given autostereoscopic display. Furthermore, as it is seen from FIG. 3 whenever the observer moves around, the static virtual image used in the diagram stays at the same location behind the aperture screen 3. Thus, the monocular movement parallax may be exhibited by the presented display. On another hand, when the eyes 10, 11 are focused on the same virtual point 32 then the viewing axis of the two eyes 10, 11 will lay along the lines connecting each corresponding eye 10, 11 with the virtual point 32. Therefore, there may be an angle between the two viewing axes of the observer's eyes and the convergence depth cue may be perceived. Similarly, a virtual point (not shown) that may be a little closer than 32 to the observer's eyes 10 and 11 will appear out of focus when the eyes 10, 11 are focused on the point 32. Thus, the accommodation depth cue may be exhibited by the presented autostereoscopic display.

FIG. 2 shows a large-scale view of part of the autostereoscopic display apparatus having one lens 21, an aperture 22 and part of the spatial light modulator 20 that presumably displays one elemental image of a modulating photogram. There are four stages 25, 26, 27 and 28 through which a light source 4 from a back lighting means (not shown) travels. Stage 25 may be a stage wherein various embodiments of the invention the light source 4 may be collimated and no information may be reconstructed. Light passes through the spatial light modulator 1 and reaches the stage 26 where light color and intensity for the point in the center of the aperture 22 may be reconstructed. Then the lens 21 refracts the light giving every ray the proper direction and the light reaches stage 27. At this stage the spatial modulation may be translated into directional modulation for the point in the center of the aperture 22 and distribution of color and intensity for the point may be reconstructed. The aperture screen 3 blocks scattered, reflected, and other unwanted light and passes only the light that contains information reconstructed about the virtual scene via apertures such as aperture 22. When the light reaches stage 28, all distribution of light for the point in the center of the aperture 22 has been reconstructed. An individual aperture 22 can be thought of as a point on a screen of the autostereoscopic display.

An important part of the invention may be the realization that the spatial light modulator and the lens array have only to deal with light rays with predetermined direction at all points on the surface of the spatial light modulator. The light source or image projector having a backlighting means, may emit a non-diffused light, for instance collimated light. This fact together with close arrangement of the modulating photogram and the lens array eliminates the problem of lens aberration and blurring typical to the conventional Integral Photography. In the conventional, prior art methods of Integral Photography, the image may be placed somewhere close to the plane formed by focal points of the lens array. The method relies on the approximation that parallel light incident on an arbitrary lens at any angle would focus on the focal plane. In reality the focal plane does not exist due to lens aberrations that are commonly present in lenses with a short focal distance. Hence there arises a blurring problem. When parallel or non-diffuse light is used to backlight the modulating photogram, the blurring problem is no longer present, since all that may be required of any lens is to focus parallel light. Lenses in the present invention do not have to focus light incident from any direction other than the predetermined direction of the back lighting means or beam. In an embodiment of the invention, this direction may be orthogonal to the plane of the lens array. This leads to another important part of the present invention: relieved requirements on functionality of lens array. Namely, the only requirement may be the ability to focus light that has a predetermined direction. This allows usage of Fresnel lenses or diffraction lenses in the lens array. These lenses have many advantages compared to conventional lenses. They are usually cheaper to produce and hence may reduce the total cost of the autostereoscopic display production. Fresnel lenses are thinner and therefore cause less chromatical aberrations. Another important advantage of Fresnel and diffraction lenses may be that it may be possible to create lenses with a very short focal distance. As the focal distance becomes shorter, the autostereoscopic display's field of view becomes larger. Conventional lenses with a very short focal distance have large aberrations and thus cannot be used effectively. Fresnel lens array, however, can have a very short focal distance without introducing any substantial aberrations in focusing incident light that has a predetermined direction.

Figure 4:
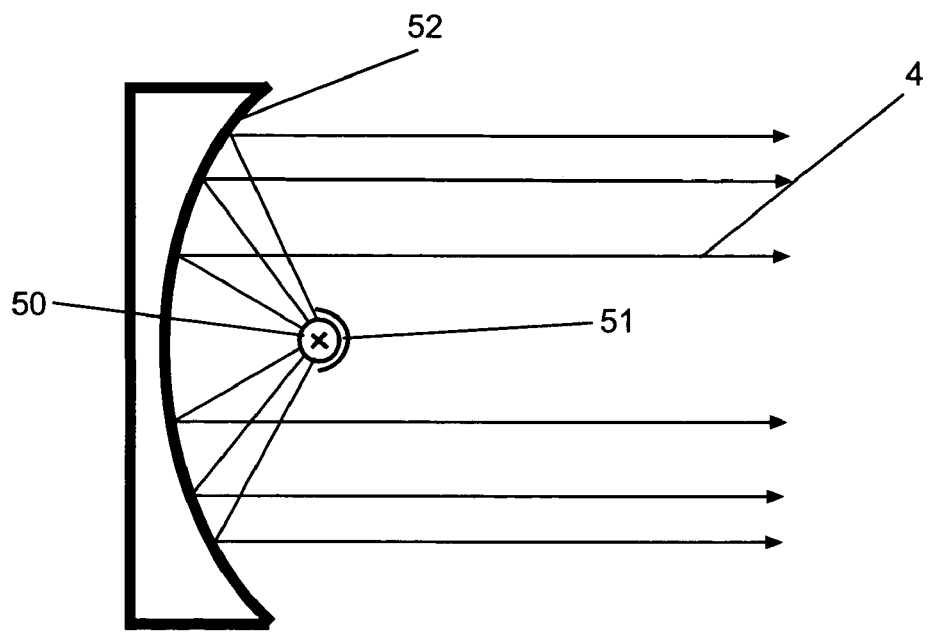
FIG. 4 is a diagrammatic, cross-sectional view of a collimated light source of various embodiments, according to the present invention.
Figure 5:
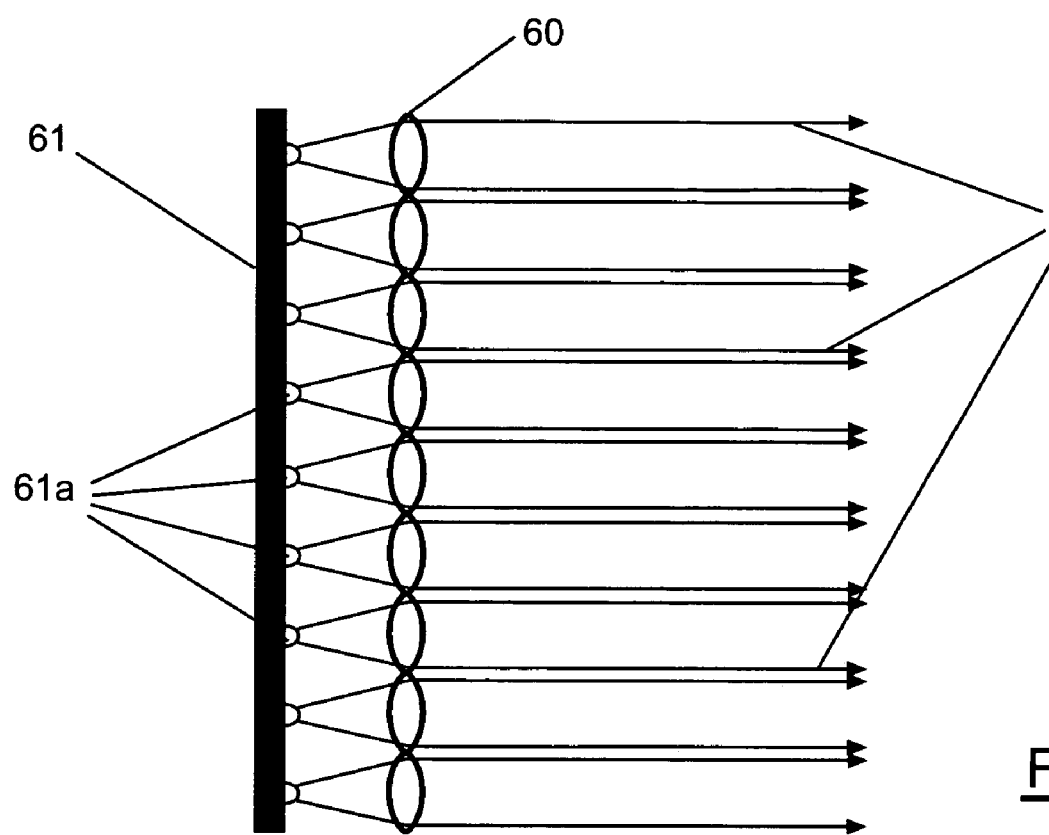
FIG. 5 is a diagrammatic, cross-sectional view of another collimated light source of various embodiments, according to the present invention.
Figure 6:
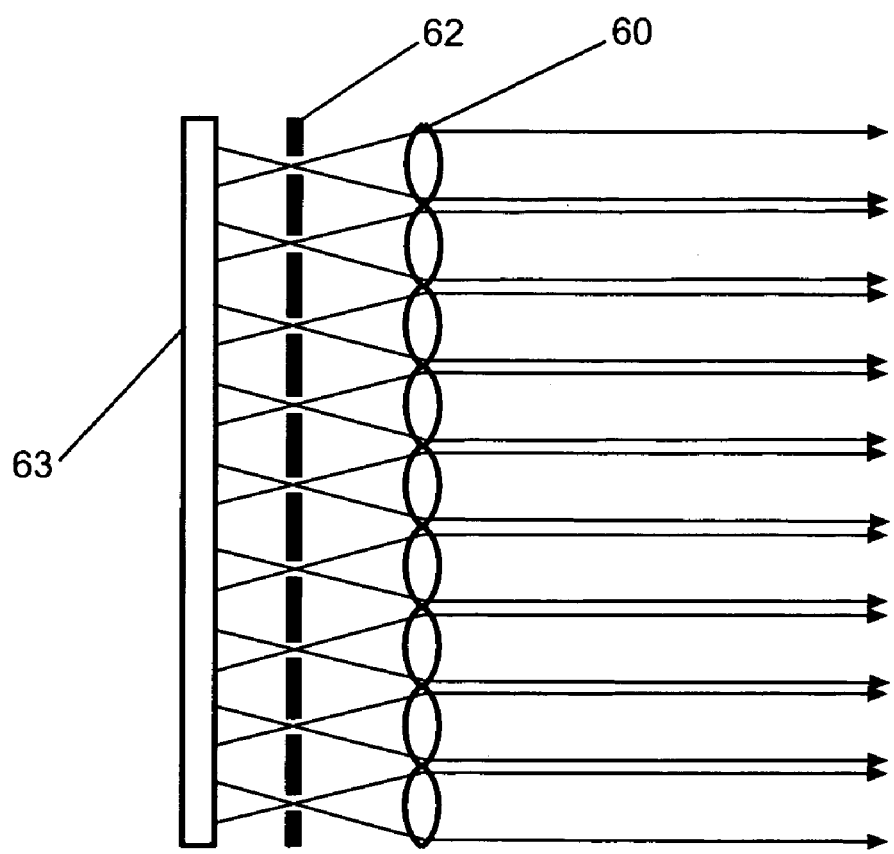
FIG. 6 is a diagrammatic, cross-sectional view of yet another collimated light source of various embodiments, according to the present invention.

Parallel light sources may be constructed in a variety of different ways. One possible source of the parallel light 4 is depicted in the FIG. 4. A light bulb 50 covered with an opaque shield 51 may be placed in the center of a concave mirror 52. The light bulb 50 emanates light uniformly in all directions and the mirror 52 reflects this light turning it into a parallel light beam 4. Another possible light source may be depicted in an embodiment of the present invention shown in FIG. 5. It consists of a lens array 60 and an array of light emitting diodes (LED) 61. Diodes (LEDs) 61a are placed at the focal points of lenses and act as a close approximation to point light sources. The lens array 60 turns light from the LEDs 61a into parallel light. An aperture screen 62 and a bright diffuse light source 63 behind that screen are depicted in FIG. 6, which may replace the LED array 61 of the previous embodiment. Yet another alternative for parallel light sources may be in the form of a laser beam (not shown) having, for example, cross-sectional dimensions the same as dimensions of the modulating photogram.

Figure 7:
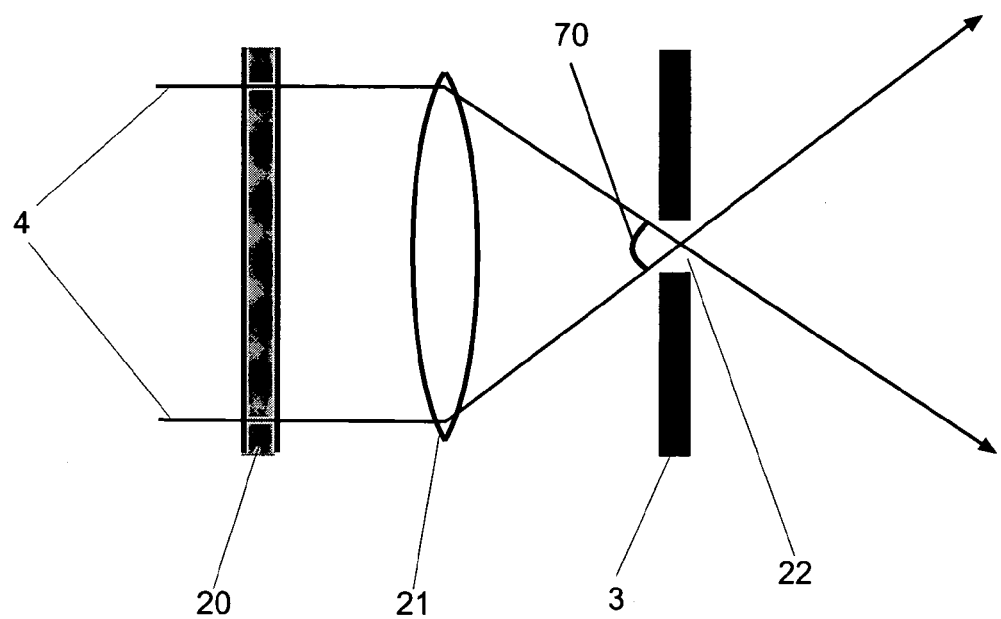
FIG. 7 is a diagrammatic, cross-sectional view of a portion of an aperture screen having a cylindrical aperture with a diameter for various embodiments according to the present invention.

The method for showing photograms, as described in de Montebello's method, supra, exhibits strong reflection from the lens array. This problem makes it difficult for an observer to focus on the virtual image behind the screen because the reflected light intensity could mask the light that forms the virtual image. An opaque aperture screen introduced in this invention diminishes this problem to the point where it may be no longer relevant. Given that apertures are sufficiently small, the light that goes through them is only the light that was recorded on the modulating photogram, thus there may be practically no reflection light. This makes it easy for a person in front of the screen to observe a virtual scene. In various embodiments, the aperture screen is made out of opaque material such as a thin plastic or metallic panel of a black matte color. Apertures should be made as small as possible. However, the apertures' shape and size should ensure that blocking of the light to be focused is negligible. In various embodiments of the invention, the apertures may not block any light that was emanated by the collimated light source and then refracted by lenses of a lens array. An example depicted in FIG. 7 illustrates calculations of a diameter of a cylindrical aperture 22. As can be seen, there is provided a lens 21 that has field of view 70 equal to 45 degrees and the width of the aperture screen 3 is 1 mm. The diameter of the aperture 22 may vary between embodiments. For example, an aperture which may not block any light coming out of the lens may have a minimum diameter approximately 1 mm.

Another advantage of using the aperture screen is that it allows for the backlighting means to have some diffuse light properties without seriously compromising the three-dimensional image reproduced on the display. The aperture screen serves as a device for selecting only light rays with predetermined direction that are focused at the center of each aperture. However, the more diffuse the light from the backlighting means the greater the chance of unwanted artifacts appearing on the display. Also, diffuse light is less effective because only a small portion of it passes through the aperture screen and can be seen by an observer. A modulating photogram shown on the spatial light modulator could be a photograph of a real scene taken using one of the methods of taking photograms described in the prior art. A modulating photogram could also be an image synthesized on a computer using computer graphics techniques. By way of additional explanation, a method for synthesizing a modulating photogram on a computer for an embodiment of the invention will be described.

A modulating photogram in the preferred embodiment of the invention is a collection of elemental images, where each elemental image is a perspective projection of a scene onto the surface of the modulating photogram. In order to maximize the field of view, the size and shape of each elemental image may be the same as the shape and size as a lens through which the elemental image is going to be displayed. The angle of view used in generation of a perspective projection may be about the same as the angle of view of the lens through which this image is going to be shown. Furthermore, when synthesizing the perspective projection the virtual camera location may be on the corresponding lens axis at a distance of approximately one focal length away from the plane of the elemental image.

This setup can be thought of as a collection of virtual cameras that are placed at aperture center points of the aperture screen and that are looking through windows bounded by lens borders of the lens array. Cameras are projecting the synthesized scene on the plane of the lens array.

A description of a synthesized virtual scene where all objects are placed behind the plane of the aperture screen has been provided. However, objects can also be placed in front of the aperture screen and hence in front of the autostereoscopic display. This can be accomplished taking into account the fact that if every elemental image of a modulating photogram is geometrically reoriented, more specifically if every image is flipped horizontally and vertically, then objects in the scene will appear before the aperture screen as part of a pseudoscopic image. Using this effect a scene can be modified to contain pseudoscopic images of objects. Then when a modulating photogram is synthesized and each elemental image may be geometrically reoriented as described above, the objects will appear in front of the screen as part of an orthoscopic image.

Figure 8:
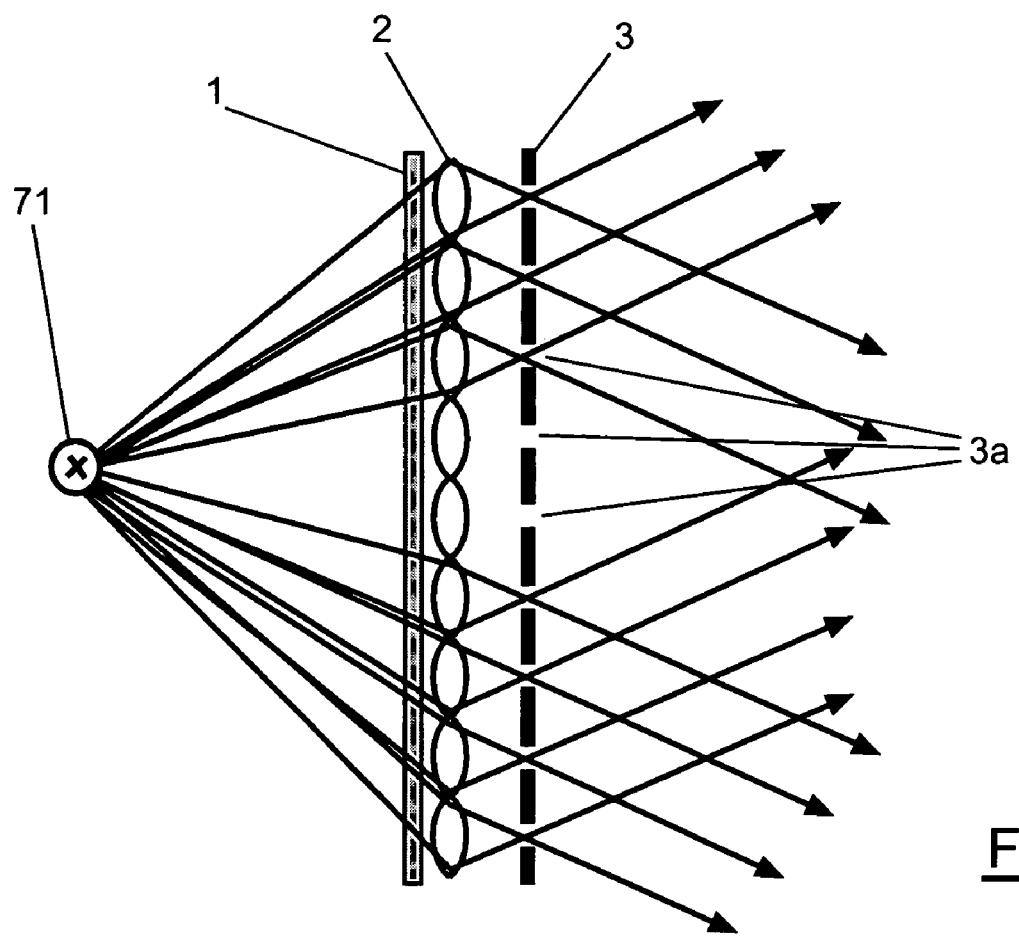
FIG. 8 is a diagrammatic, cross-sectional view of a point light source of various embodiments, according to the present invention.

Various embodiments of the invention described above use a collimated light source. However, an alternative embodiment, as shown in FIG. 8, may use a point light source 71 by using, for example, a custom-made Fresnel lens array 2 that collects light from the light source 71 and focuses it at the centers of apertures 3a in the aperture screen 3 in the same way as a lens array focuses light for the case of parallel light source. In various embodiments such as this, the modulating photogram displayed on the spatial light modulator 1 may be different than the modulating photogram used in the collimated light source. The following condition may still hold: every ray emitted by the point light source 71 can cross one elemental image on the modulating photogram and one lens in the lens array 2.

Figure 9:
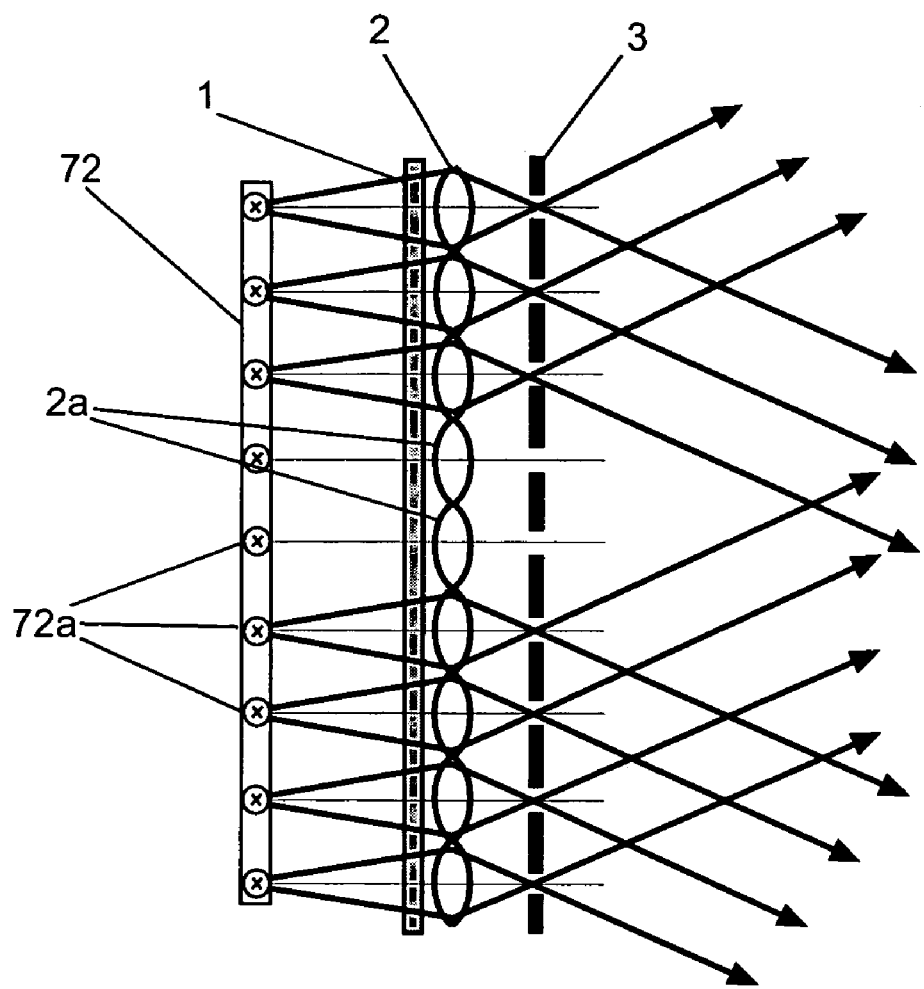
FIG. 9 is a diagrammatic, cross-sectional view of an array of point light sources of various embodiments, according to the present invention.

Various embodiments of the invention, one of which is shown in FIG. 9, use an array of point light sources 72 as the back lighting means. In this embodiment, there may be one point light source 72a for every lens 2a of the lens array 2. Every point light source 72a of the array of point light sources 72 may be placed on the corresponding lens axis in front of the spatial light modulator 1.

Other alternative embodiments of this invention may use a different light sources or a collection of such. The property that unites all such embodiments is that the light has a predetermined direction at every point before entering the modulating photogram and thus it is not a diffused light. The lenses should be made in accordance with the position and nature of the light source for every embodiment of this invention. The spatial light modulator should modulate light according with the placement and arrangements of lenses and in accordance with the incident light from a non-diffused light source.

One of the important advantages of the invention over prior art is the fact that the autostereoscopic display apparatus is not time-multiplexed. Those skilled in the art are familiar with an approach where a back lighting beam changes direction with time and passes through a spatial time modulator. Thus light intensity and color are shown for each different direction at different times. Such approach has been called "time-multiplexed". However, the method requires the spatial light modulator to function at a very high frequency since there can be a very large number of directions for which the light has to be modulated. In addition, in order to avoid flickering, the full modulation cycle through all directions has to happen around 24 times a second. This means that such apparatus reproducing 100 different directions has to have a spatial light modulator that works at a frequency around 2.5 kHz for reproduction of a static stereoscopic picture. Such devices are very expensive to produce, if at all possible.

The present invention introduces a device that is not time-multiplexed. No changes in the system are required to show a single static three-dimensional image. To produce a motion autostereoscopic picture, the spatial light modulator has to modulate light differently at the rate of at least 24 times a second. This means that the spatial light modulator has to work at a normal frequency of 24-80 Hz. Such frequency eliminates any flickering. A readily available liquid crystal display can be used in the system.

Figure 10:
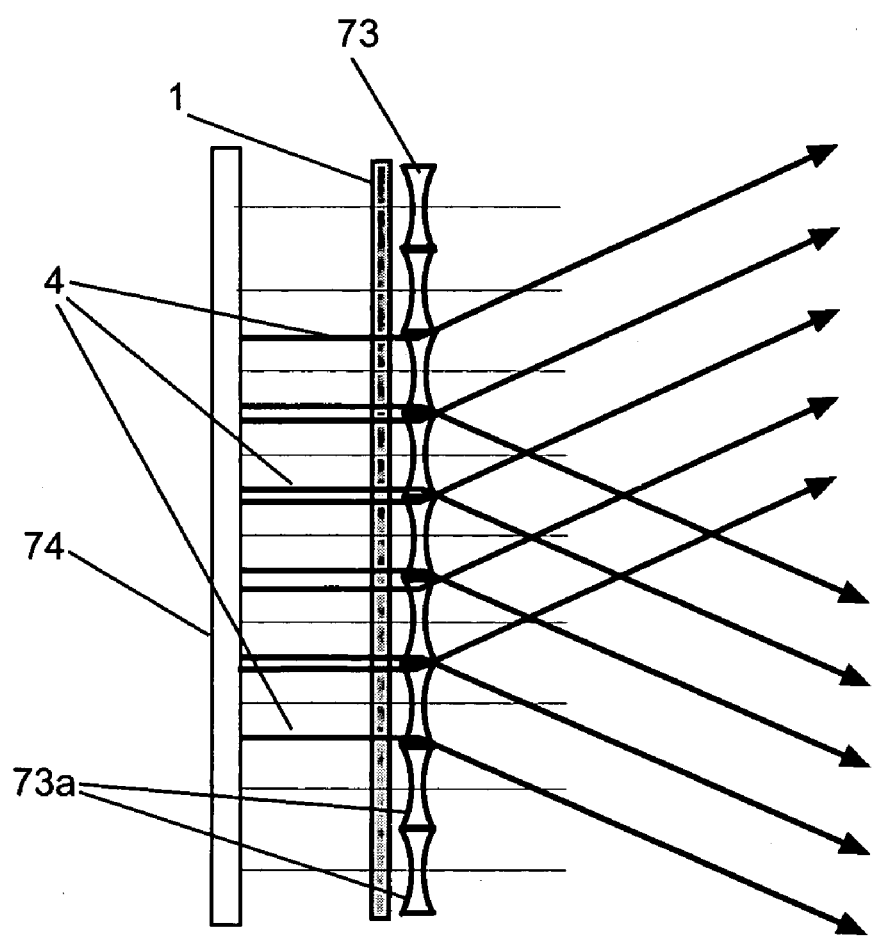
FIG. 10 is a diagrammatic, cross-sectional view of a lens array having a plurality of diverging lens of various embodiments, according to the present invention.

Another possible embodiment of the invention is shown in FIG. 10 and uses an array of diverging lenses 73, a spatial light modulator 1 and a collimated light source 74. No aperture screen is used in this case. In this arrangement, the three-dimensional image may be formed by light rays refracted by each diverging lens 73a of the lens array 73. Light rays seem to be exiting from the focal points of each diverging lens.

Figure 11:
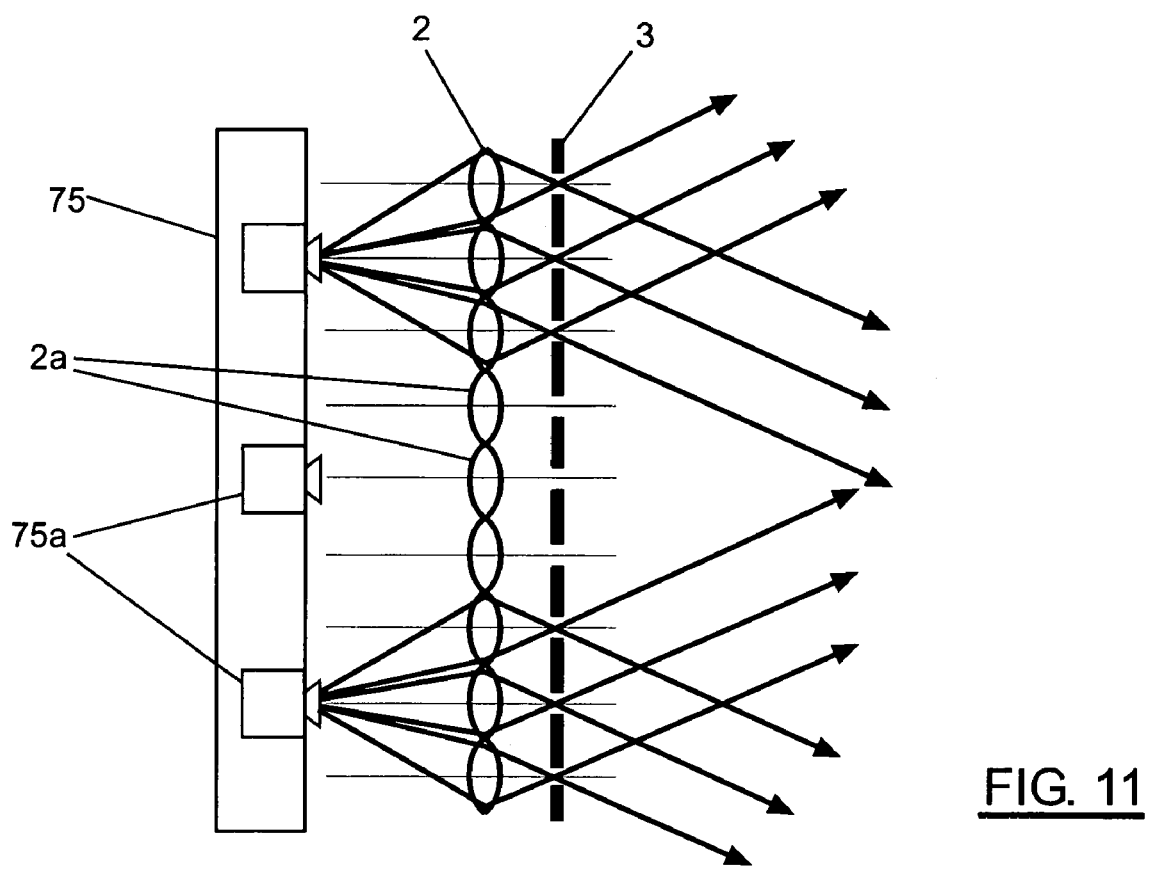
FIG. 11 is a diagrammatic, cross-sectional view of an array of image projectors of various embodiments, according to the present invention.

In yet another embodiment of the invention shown in FIG. 11, the functionality of the spatial light modulator and the non-diffuse light source may be merged together in a form of an array of projectors 75. Such projectors 75a emit light that has a predetermined direction at every point on the lens array 2; the light is already modulated and has passed through each projector's 75a own spatial light modulator (not shown). The light from each single projector is then refracted by several lenses 2a of the lens array 2. If the projector array 75 is placed relatively close to the lens array 2 then in order to accommodate the non-collimated nature of light incident on the lens array 2, elemental lenses 2a of the lens array have to have specially designed refraction functions to refract light in the same way as an array of converging lenses refracts a beam of collimated light.

Figure 12:
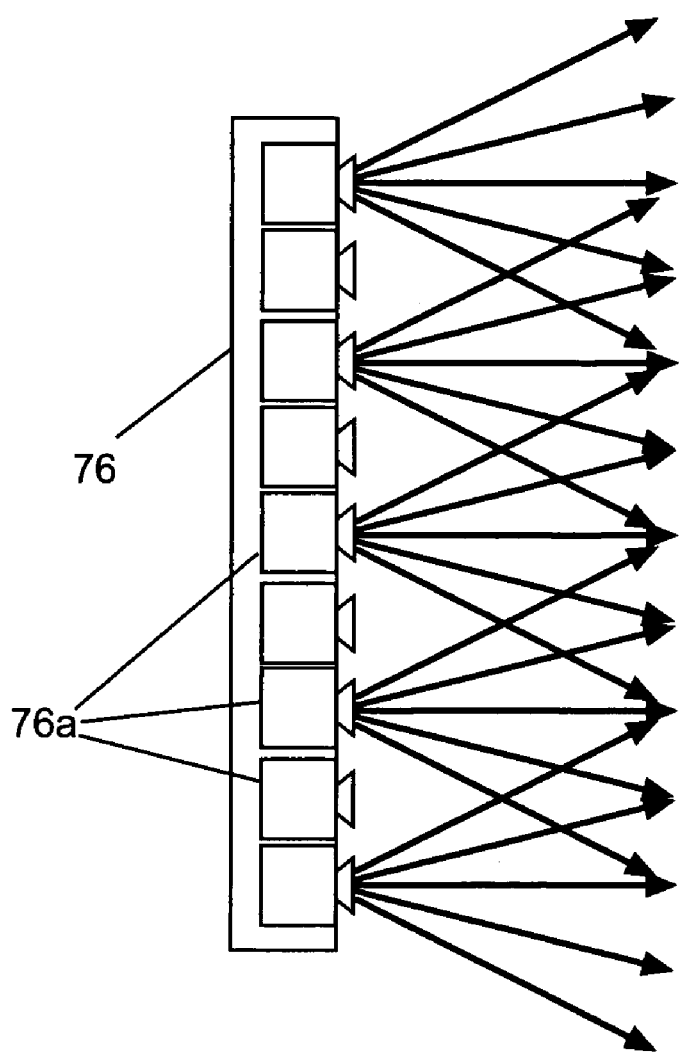
FIG. 12 is a diagrammatic, cross-sectional view of an array of light projectors of various embodiments and illustrating the creation therefrom of directional light distribution from a three-dimensional scene.

In yet another embodiment of the present invention shown in FIG. 12, the functionality of the spatial light modulator, the non-diffuse light source and the lens array may be combined together into an array of light projectors 76. When an array of these light projectors is sufficiently large and light projectors 76a are placed close to each other relative to the distance from which they are viewed, then a three-dimensional image exhibiting all four physiological depth perception cues can be formed. Such an array of projectors would be an autostereoscopic display, where each projector acts as pixel on the display that reproduces directional distribution of light of a three-dimensional scene shown on the display.

Figure 13:
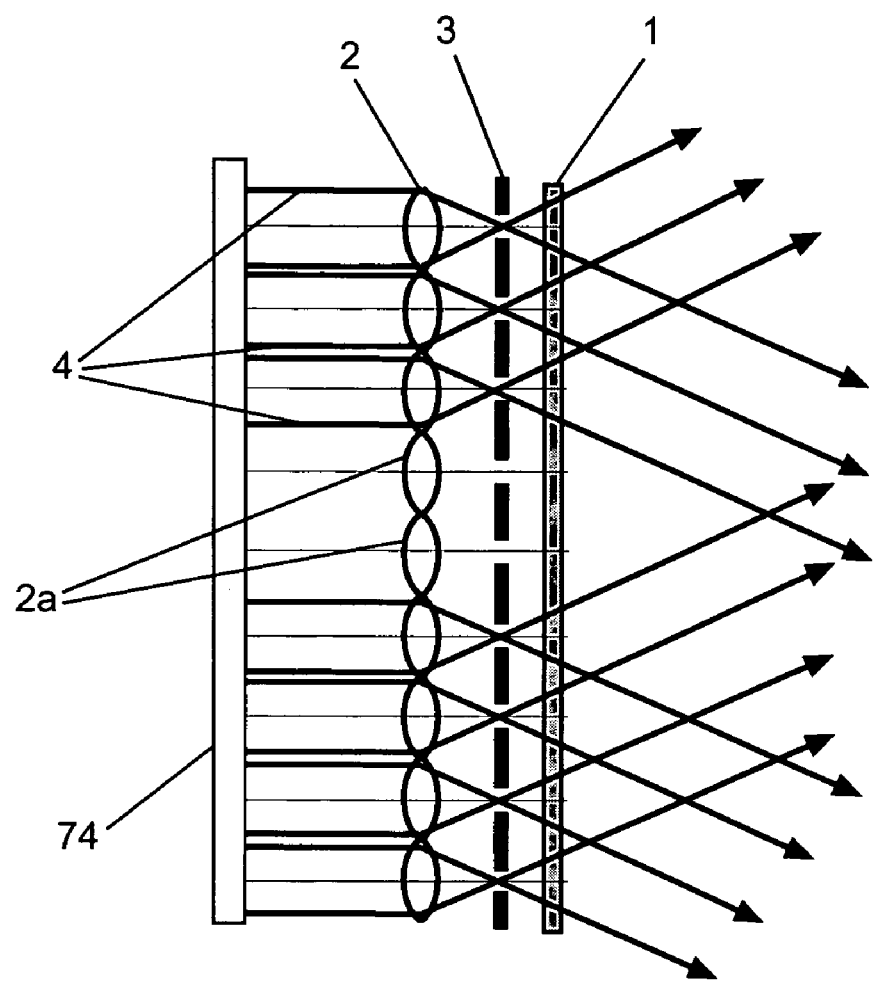
FIG. 13 is a diagrammatic, cross-sectional view of a second embodiment having a spatial light modular disposed in front of a lens array, according to the present invention.

Another possible embodiment of the present invention is shown on FIG. 13. In this embodiment, the spatial light modulator 1 may be placed in front of the lens array 2 as viewed from the viewer's position. Light 4 emitted from a collimated source 74 is refracted by individual lenses 2a of the lens array 2 and then is passed through the spatial light modulator 1. It is important to note that the spatial light modulator 1 can be placed either in front or behind the plane formed by focal points of individual lenses 2a. An optional aperture screen 3 can be added to the apparatus and placed in front of the lens array 2 at, for example, a distance equal to the focal distance of individual lenses 2a of the lens array 2. In such an arrangement, the focal points of individual lenses 2a coincide with apertures of the aperture screen.

Figure 14:
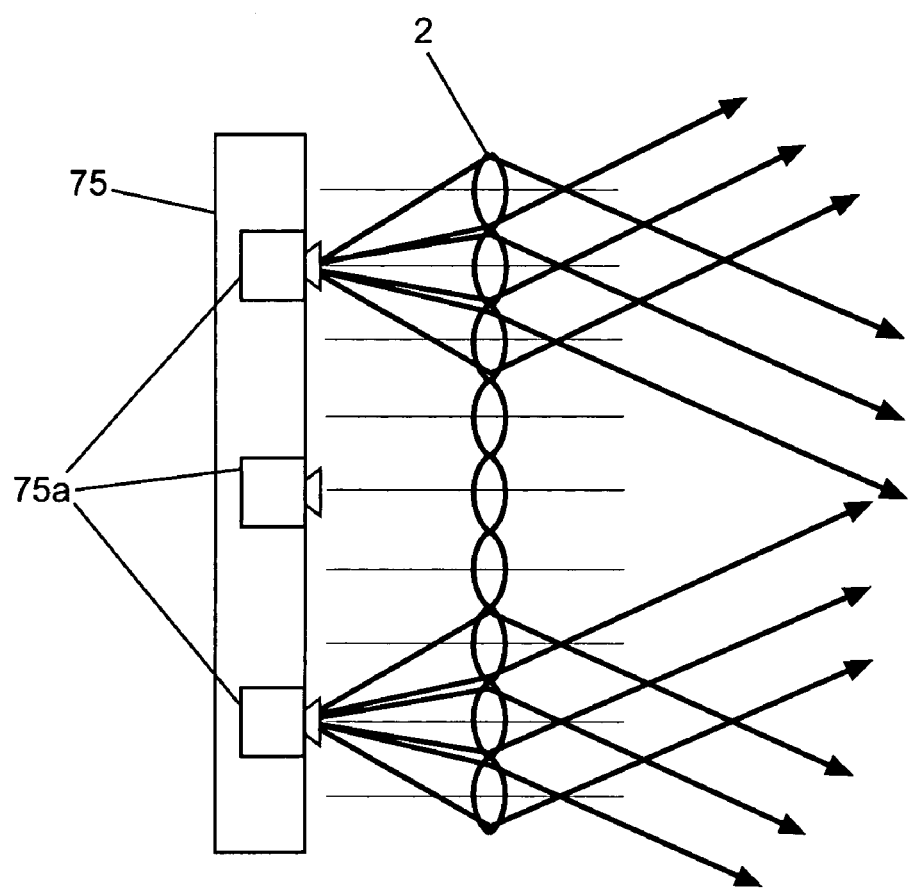
FIG. 14 is a diagrammatic, cross-sectional view of a third embodiment having an image projector with an array of liquid crystal display projectors and a lens array, according to the present invention.
Figure 15:
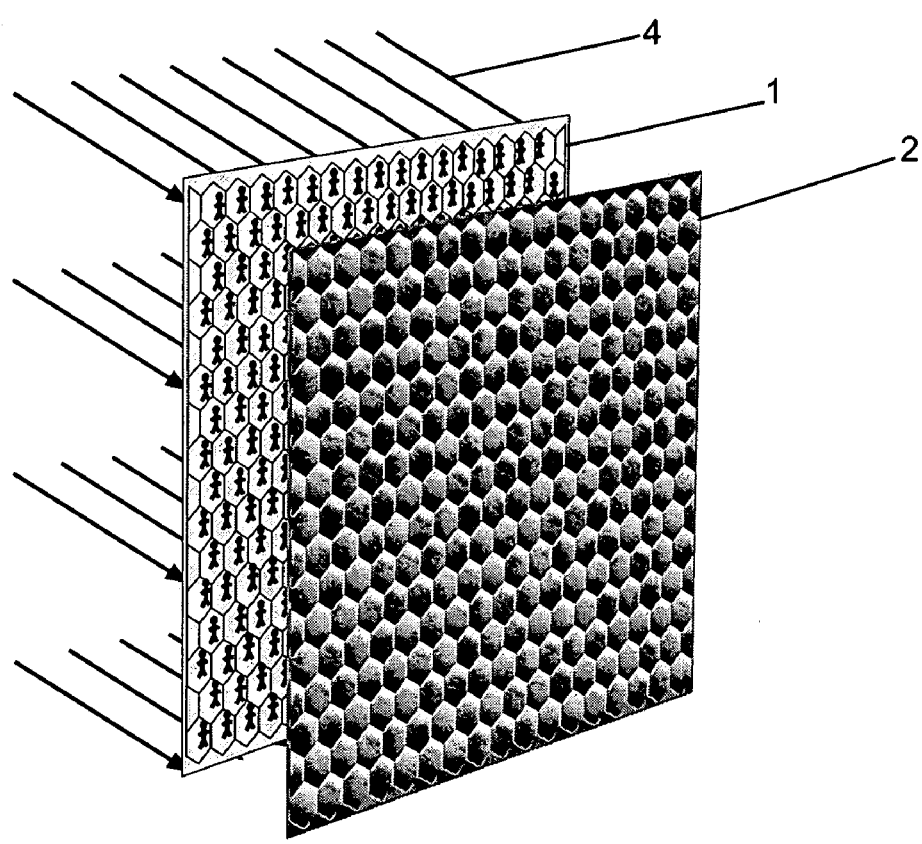
FIG. 15 is a diagrammatic, perspective view of a fourth embodiment having a non-diffuse light source, a spatial light modulator, and a lens array, according to the present invention.
Figure 16:
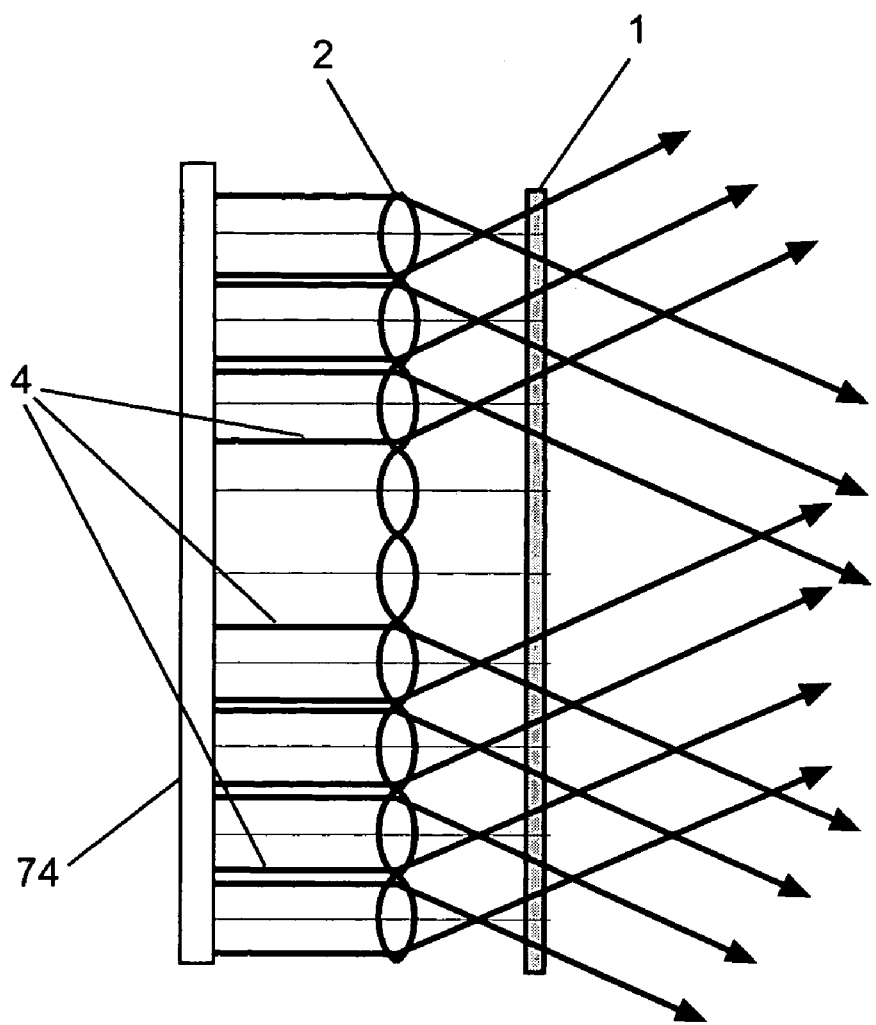
FIG. 16 is a diagrammatic, cross-sectional view of a fifth embodiment having a lens array disposed between a backlighting means and a spatial light modulator, according to the present invention.
Figure 17:
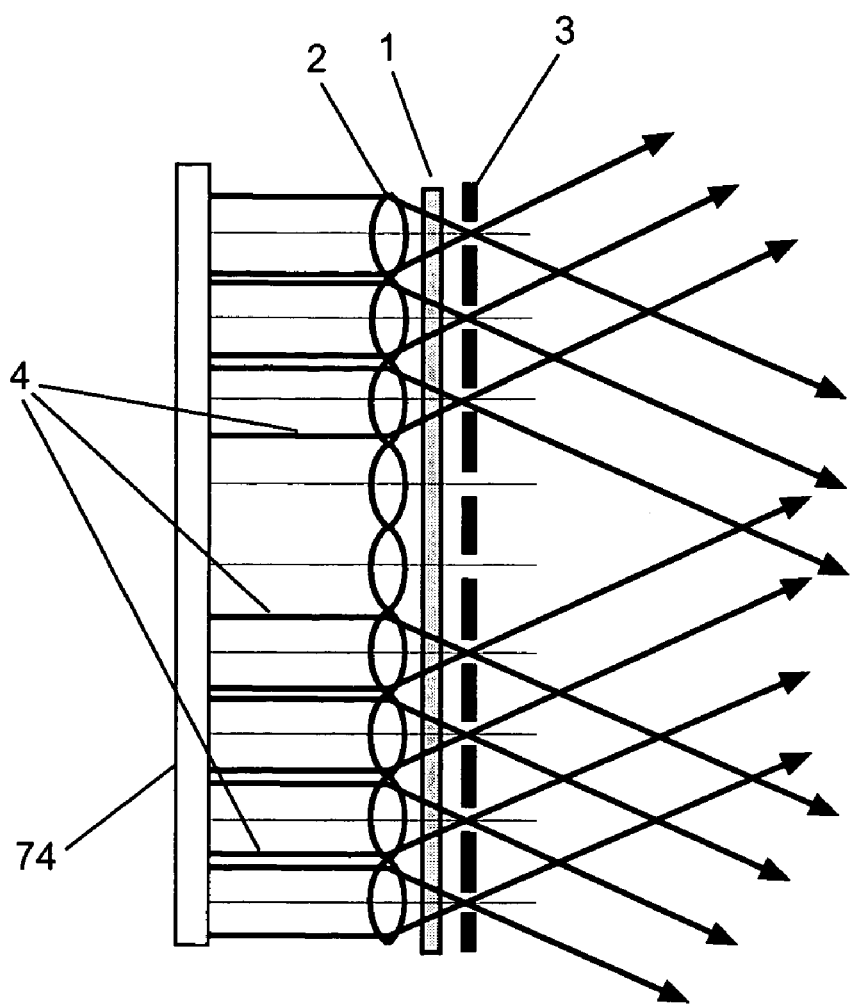
FIG. 17 is a diagrammatic, cross-sectional view of a sixth embodiment having a spatial light modulator disposed between a lens array and an aperture screen, according to the present invention.

As a skilled artisan will note, the present invention contemplates any combinations of components so long as the functionality described herein is carried out. For example, and with reference to FIG. 14, there is shown an embodiment having an array of image projectors 75 where each image projector 75a comprises a liquid crystal display projector. A lens array 2 is also included. In another example, and as shown in FIG. 15, the present invention may be embodied as simple a non-diffuse light 4, a spatial light modulator 1, and lens array 2. Yet another embodiment shown in FIG. 16 includes a backlighting means 74 for producing a non-diffuse light source 4, a lens array 2, and a spatial light modulator 1. Still another embodiment shown in FIG. 17 comprises a backlighting means 74 generating a non-diffuse light 4, a lens array 2, a spatial light modulator 1, and an aperture screen 3, wherein the spatial light modulator 1 is disposed between the lens array 2 and the aperture screen 4.

Figure 18:
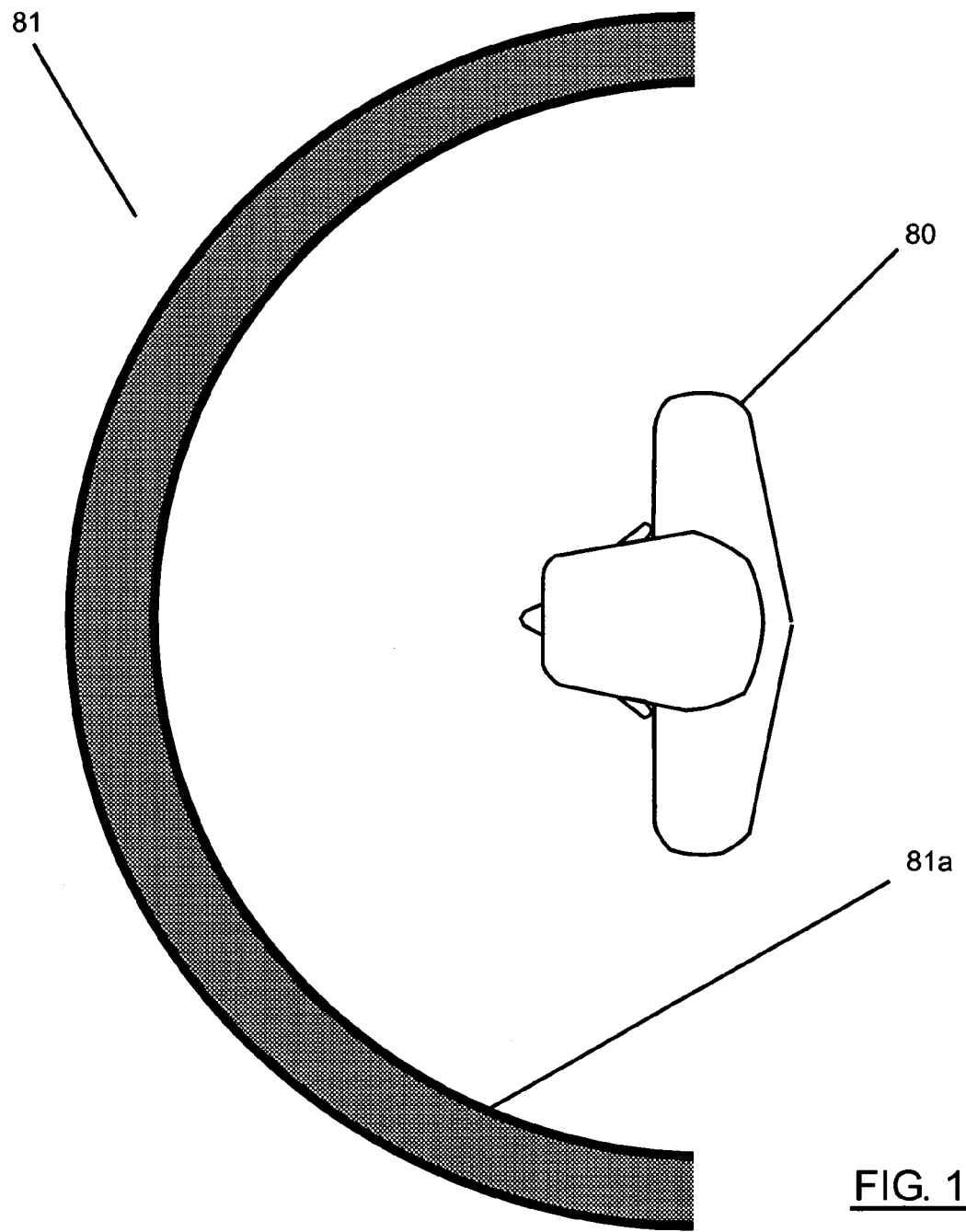
FIG. 18 is a schematic view of a seventh embodiment having a display surface at least partially surrounding a viewer, according to the present invention.

Turning to FIG. 18, there is shown an a further embodiment of an autostereoscopic display apparatus 81 having a display surface 81a such that the display surface 81a at least partially surrounds a viewer depicted at 80. This display surface generates images appearing to at least partially surround the viewer, such that the viewer experiences a sense of location within the depicted scenery.

Figure 19:
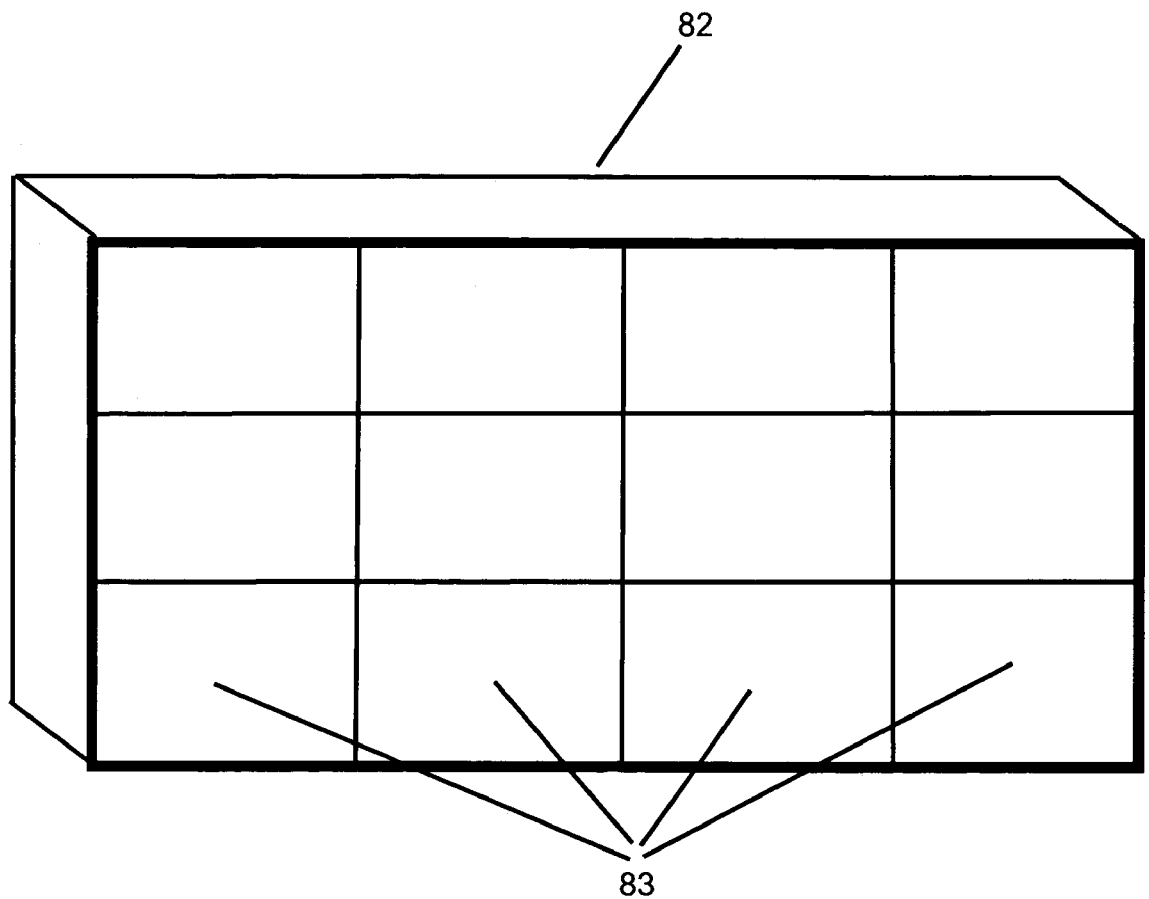
FIG. 19 is a schematic view of an eighth embodiment having more than one autostereoscopic display apparatus, according to the present invention.

With reference to FIG. 19, there is generally shown a still further embodiment of the present invention wherein a comprehensive autostereoscopic display apparatus 82 comprises more than one individual autostereoscopic display apparatus 83.

Figure 20:
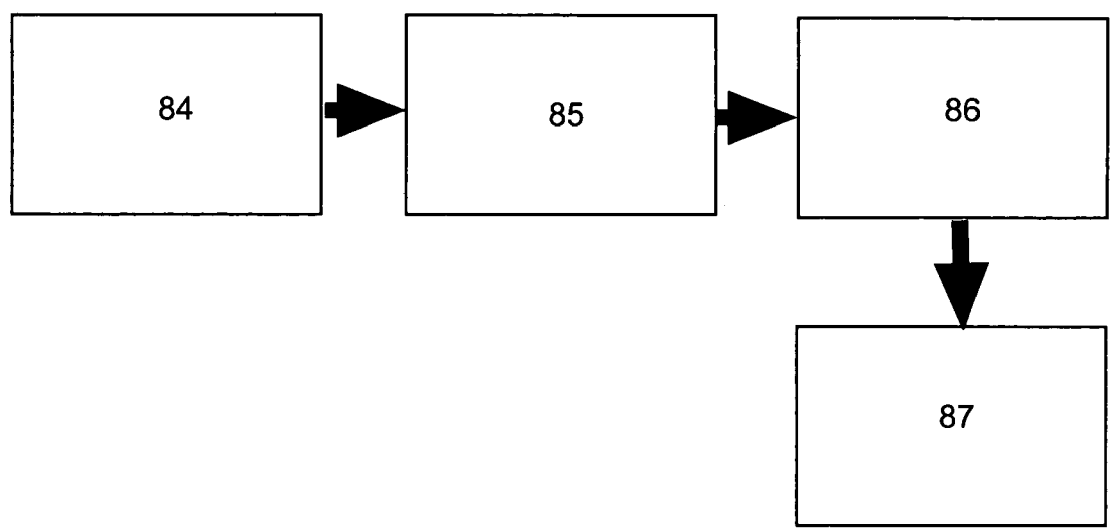
FIG. 20 is a block diagram view of a ninth embodiment of an autostereoscopic display apparatus, as used in a television receiving system as a visual display device, according to the present invention.

It is noted that various embodiments of the present invention may be included as part of a larger system to autostereoscopically displayed images. For example, as shown in FIG. 20, a block diagram depicts an autostereoscopic display apparatus 87 used in a television display receiving system also having an antenna or cable input device 84, a television signal receiver 85, and a television signal decoder 86. It is contemplated that the latter three components may pass a decoded image to the autostereoscopic display apparatus 87, which in turn generates an autostereoscopic display for viewers.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. An autostereoscopic display apparatus for generating a three-dimensional image having four physiological depth perception cues of accommodation, convergence, binocular parallax and monocular movement parallax, the autostereoscopic display apparatus comprising:

a collimated light source emitting a plurality of parallel light rays; and a spatial light modulator for receiving the plurality of parallel light rays from the collimated light source and for changing the colors and the intensities of the parallel light rays to predetermined values to form a plurality of independent and non-overlapping images; and a lens array having a plurality of lenses, each lens in the plurality of lenses for receiving one of the independent and non-overlapping images, each independent and non-overlapping image formed by the plurality of parallel light rays, each parallel light ray of the plurality of parallel light rays having a predetermined direction, intensity, and color at each point of receipt on each lens in the plurality of lenses and for redirecting the light rays to form a plurality of redirected light rays that generate the three-dimensional image having the four physiological depth perception cues.

2. An autostereoscopic display apparatus for generating a three-dimensonal image having four physiological depth perception cues of accommodation, convergence, binocular parallax and monocular movement parallax, the autostereoscopic display apparatus comprising:

a backlighting means comprising a collimated light source of parallel light rays;

a lens array having a plurality of lenses, each lens in the plurality of lenses for receiving and for redirecting the parallel light rays; and a spatial light modulator containing a plurality of independent and non-overlapping images, each independent and non-overlapping image for receiving the redirected light rays from an individual lens of the lens array and for changing colors and intensities of each of the light rays to predetermined values in accordance with each image to form the three-dimensional image having the four physiological depth perception cues, wherein the lens array is disposed between the backlighting means and the spatial light modulator.

3. An autostereoscopic display apparatus for generating a three-dimensional image having four physiological depth perception cues of accommodation, convergence, binocular parallax and monocular movement parallax, the autostereoscopic display apparatus comprising:

a backlighting means comprising a collimated light source of parallel light rays;

a lens array having a plurality of lenses, each lens in the plurality of lenses for receiving the parallel light rays;

each light ray of the light rays having a predetermined direction at a point of receipt on each lens in the plurality of lenses, and each lens in the plurality of lenses for redirecting the light rays;

an opaque aperture screen forming a plurality of transparent apertures therein, each aperture in the plurality of apertures for permitting passage of the redirected light rays from a particular lens of the lens array therethrough, the aperture screen having:

a first surface for inhibiting unwanted light from any source; and a second surface absorbing unwanted light from any source; and a spatial light modulator containing a plurality of independent and non-overlapping images, each independent and non-overlapping image for receiving the redirected light rays passed from a single transparent aperture of the plurality of transparent apertures in the aperture screen and for changing colors and intensities of each of the light rays to predetermined values in accordance with each image to form the three-dimensional image having the four physiological depth perception cues.

4. An autostereoscopic display apparatus for generating a three-dimensional image having four physiological depth perception cues of accommodation, convergence, binocular parallax and monocular movement parallax, the autostereoscopic display apparatus comprising:
 a backlighting means comprising a collimated light source of parallel light rays;
 a lens array having a plurality of lenses, each lens in the plurality of lenses for receiving the parallel light rays;
 each light ray of the light rays having a predetermined direction at a point of receipt on each lens in the plurality of lenses, and each lens in the plurality of lenses for redirecting the light rays;
 an opaque aperture screen forming a plurality of transparent apertures therein, each aperture in the plurality of apertures for permitting passage of the redirected light rays from a particular lens of the lens array therethrough, the aperture screen having:
  a first surface for inhibiting unwanted light from any source; and
  a second surface absorbing unwanted light from any source; and
 a spatial light modulator, wherein the spatial light modulator is disposed between the lens array and the aperture screen, the spatial light modulator for receiving the redirected light from the lens array and for changing colors and intensities of each of the light rays to predetermined values and for transmitting the independent and non-overlapping images of the spatial light modulator for passage through the plurality of apertures in the aperture screen, one independent and non-overlapping image per aperture, to form the three-dimensional image having the four physiological depth perception cues.

5. A method for generating a three-dimensional image having four physiological depth perception cues of accommodation, convergence, binocular parallax and monocular movement parallax, the method comprising steps of:
 providing a collimated light source having parallel light rays;
 emitting the parallel light rays through a plurality of independent and non-overlapping images of a spatial light modulator; and
 receiving from each independent and non-overlapping image of the spatial light modulator, with a lens array having a plurality of lenses, each light ray of the generated independent and non-overlapping images having a predetermined direction, intensity and color at a point of receipt on each lens in the plurality of lenses; and
 redirecting the received light rays to form the three-dimensional image having the four physiological dept perception cues.

6. The autostereoscopic display apparatus of claim 1, further comprising:
 an opaque aperture screen forming a plurality of transparent apertures therein, each aperture in the plurality of apertures for permitting passage of the redirected light rays from each lens of the lens array therethrough and after passage to form the three-dimensional image having the four physiological depth perception cues, the aperture screen having:
  a first surface for inhibiting unwanted light from any source; and
  a second surface for absorbing unwanted light from any source.

7. The autostereoscopic display apparatus of claims 1, 6, 2, 3, or 4 wherein at least one lens in the plurality of lenses functions as a converging lens.

8. The autostereoscopic display apparatus of claim 1 or 2, wherein at least one lens in the plurality of lenses functions as a diverging lens.

9. The autostereoscopic display apparatus of claims 1, 6, 2, 3, or 4, wherein at least one lens in the lens array is a Fresnel lens.

10. The autostereoscopic display apparatus of claims 1, 6, 2, 3, or 4, wherein at least one lens in the plurality of lenses is a diffraction lens.

11. The autostereoscopic display apparatus of claims 2, 3, or 4 wherein the backlighting means is a point light source.

12. The autostereoscopic display apparatus of claims 2, 3 or 4, wherein the backlighting means, is an array of point light sources, each point light source in the array of point light sources separated by a plurality of opaque partitions to prevent illumination of a single area on a backlit surface by more than one point light source in the array of point light sources.

13. The autostereoscopic display apparatus of claims 1, 6, 2, 3, or 7, wherein the spatial light modulator is a liquid crystal display.

14. The autostereoscopic display apparatus of claim 1, 6, 2, 3, or 4 wherein the collimated light source comprises a color-multiplexed collimated light source.

15. The autostereoscopic display apparatus of claims 1, 6, 2, 3, or 4 used in a television receiving system as a visual display device.

16. The autostereoscopic display apparatus of claims 1, 6, 2, 3, or 4, wherein the autostereoscopic display apparatus further comprises a display surface at least partially surrounding viewers whereby the four physiological depth perception cues of the image displayed from the outer surface cause the viewers to visually perceive themselves as residing within at least a portion of the three-dimensional scenery of the image.

17. The autostereoscopic display apparatus of claims 1, 6, 2, 3, or 4, wherein the autostereoscopic display apparatus itself comprises more than one autostereoscopic display apparatus.

18. The method of claim 5, further comprising steps of:
 permitting, via an opaque aperture screen having a plurality of apertures formed therein, a first surface, and a second surface, passage of redirected light rays from each lens of the lens array through the plurality of apertures;
 inhibiting unwanted light via the first surface; and
 absorbing unwanted light via the second surface.

* * * * *